United States Patent [19]

Kim et al.

[11] Patent Number: 5,254,605
[45] Date of Patent: Oct. 19, 1993

[54] IMIDE EPOXY RESIN COMPOSITION FOR SEALING SEMICONDUCTOR ELEMENTS

[75] Inventors: Whan G. Kim, Seoul; Byung W. Lee, Yongin; Ji Y. Lee, Seoul, all of Rep. of Korea

[73] Assignee: Cheil Industries, Inc., Rep. of Korea

[21] Appl. No.: 964,457

[22] Filed: Oct. 21, 1992

[30] Foreign Application Priority Data

Nov. 30, 1991 [KR] Rep. of Korea ............... 91-21870
Nov. 30, 1991 [KR] Rep. of Korea ............... 91-21871
Nov. 30, 1991 [KR] Rep. of Korea ............... 91-21872

[51] Int. Cl.$^5$ ............... C08G 59/26; C08G 59/32; C08G 73/06; C08G 73/10
[52] U.S. Cl. ............... 523/428; 523/429; 523/443; 523/466; 525/476; 525/482; 525/484; 528/96
[58] Field of Search ............... 523/443, 466, 428, 429; 525/476, 482, 484; 528/96

[56] References Cited

U.S. PATENT DOCUMENTS

| | | | |
|---|---|---|---|
| 4,600,769 | 7/1986 | Kumar et al. | 528/220 |
| 4,636,542 | 1/1987 | Hefner et al. | 528/96 |
| 4,786,669 | 11/1988 | Dewhirst | 528/98 |
| 5,189,082 | 2/1983 | Kim et al. | 525/481 |

FOREIGN PATENT DOCUMENTS

| | | |
|---|---|---|
| 54-142298 | 11/1979 | Japan . |
| 58-215452 | 12/1983 | Japan . |
| 62-477 | 1/1987 | Japan . |
| 62-7719 | 1/1987 | Japan . |
| 62-7723 | 1/1987 | Japan . |
| 62-106920 | 5/1987 | Japan . |
| 62-132961 | 6/1987 | Japan . |
| 62-260817 | 11/1987 | Japan . |
| 62-230725 | 9/1988 | Japan . |

*Primary Examiner*—Frederick F. Krass
*Attorney, Agent, or Firm*—Merchant, Gould, Smith, Edell, Welter & Schmidt

[57] ABSTRACT

An epoxy resin composition for sealing semiconductor elements comprising o-cresol-novolak type epoxy resins, curing agents, curing accelerators, plasticizer and a high performance epoxy resin selected from a group consisting of epoxy resins represented by the formulas (I-a), (I-b) and (I-c) is disclosed.

Use of the high performance epoxy resin in an amount of from 0.1 to 20.0% by weight improves the heat and moisture resistance of the epoxy resin composition.

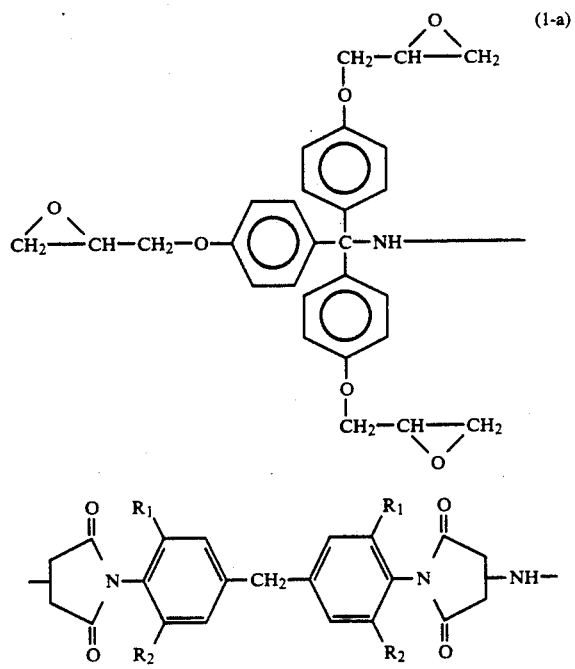

(Abstract continued on next page.)

-continued
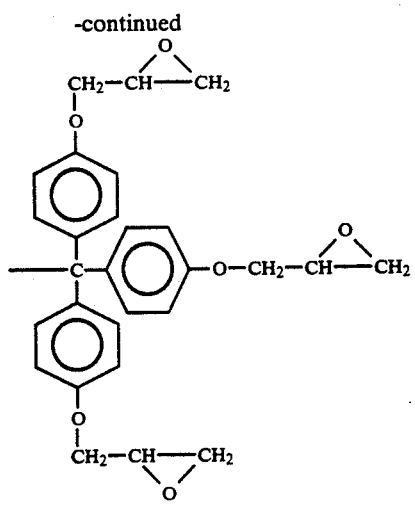
-continued
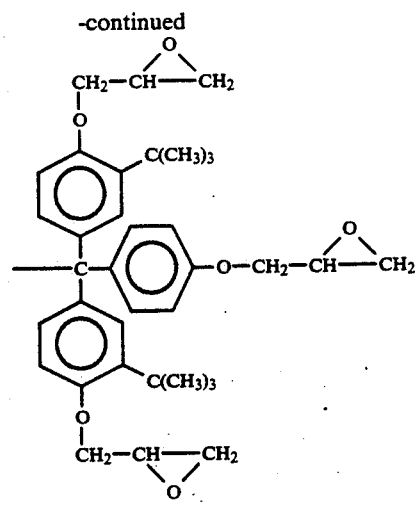
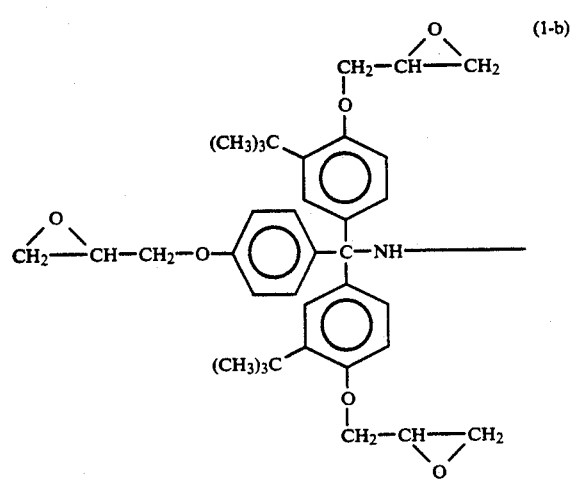
(1-b)
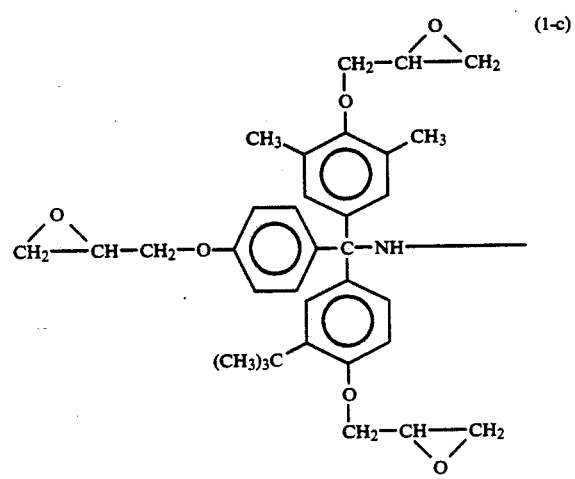
(1-c)
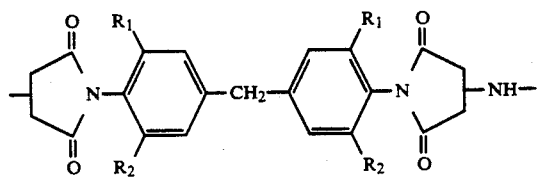
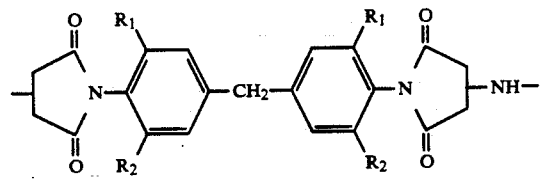
(Abstract continued on next page.)

-continued
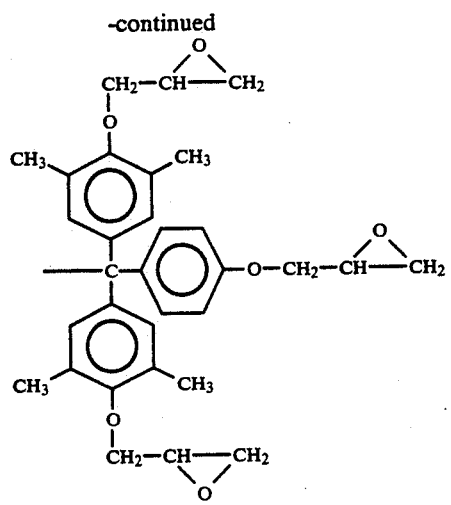
wherein,
R$_1$ and R$_2$ represent independently H or (CH$_2$)nCH$_3$ radical, and
n represents 0 or an integer of 1 above.
2 Claims, No Drawings

IMIDE EPOXY RESIN COMPOSITION FOR SEALING SEMICONDUCTOR ELEMENTS

FIELD OF THE INVENTION

The present invention relates to an epoxy resin composition for sealing semiconductor elements. The epoxy resin composition of the present invention manifests the low stress, high heat and moisture resistant characteristics required for sealing semiconductor elements.

BACKGROUND OF THE INVENTION

Recently, owing to the tendency of electric and electronic components to be small and thin, IC and LSI packages have become varied. Especially, while the size of a chip has become larger, the package has become thinner and varied with high pin numbers.

The mounting technology has also varied according to surface mounting technology. Recently, Thin Small Out-line J-Bend Packages(TSOJ) having a thickness of about 1 mm are being produced. TSOJ, which is a medium stage type between a Small Out-line J-Bend Package(SOJ)/Quad Flat Package(QFP) and a Tape Automated Bonding(TAB), will be used as the main type of package in the memory element field in the near future.

The resin composition for sealing such semiconductor elements requires strict low stress, high heat and moisture resistant properties over the prior art compositions.

The method for decreasing inner stress by adding plasticizers such as a modified silicone oil or CTBN[Japanese Laid-open Patent Publication Nos. (Sho) 63-230725, 62-7723, 62-132961 and 62-260817] and the method for lowering the thermal expansion coefficient by increasing the amounts of fillers [Japanese Laid-open Patent Publication No. (Sho) 62-106920] are known as low stress techniques. However, such methods have serious problems such as low heat resistance, moldability and abrasion of equipment.

The method for improving heat resistance by using polyfunctional epoxy resins [Japanese Laid-open Patent Publication Nos. (Sho) 62-477, 62-7719 and 62-7723] and the method for increasing heat resistance by using a bismaleimide [Japanese Laid-open Patent Publication Nos. (Sho) 54-142298 and 58-215452] are well known. However, these methods have problems in that due to an increase in the glass transition temperature of the resin composition the moisture resistant property decreases.

SUMMARY OF THE INVENTION

The object of the present invention is to provide an epoxy resin composition suitable for sealing super thin high integrated circuits, with the use of a high performance epoxy resin capable of providing low stress, high heat and high moisture resistance characteristics.

The present invention is directed to an epoxy resin composition comprising o-cresol-novolak type epoxy resin, phenol-novolak type curing agent, curing accelerator and inorganic filler, characterized in that a high performance epoxy resin selected from a group consisting of an epoxy resin having formula (I-a), an epoxy resin having formula (I-b) and an epoxy resin having formula (I-c) is incorporated into the o-cresol-novolak type epoxy resin.

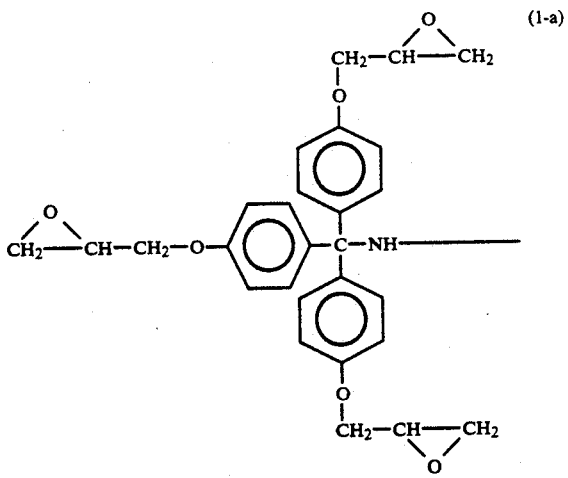

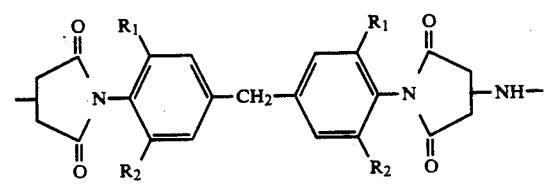

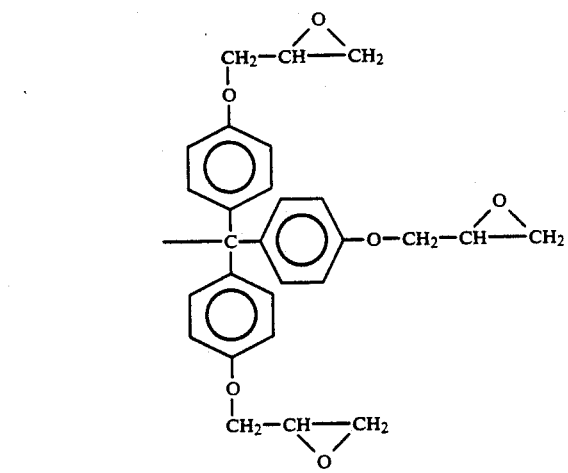

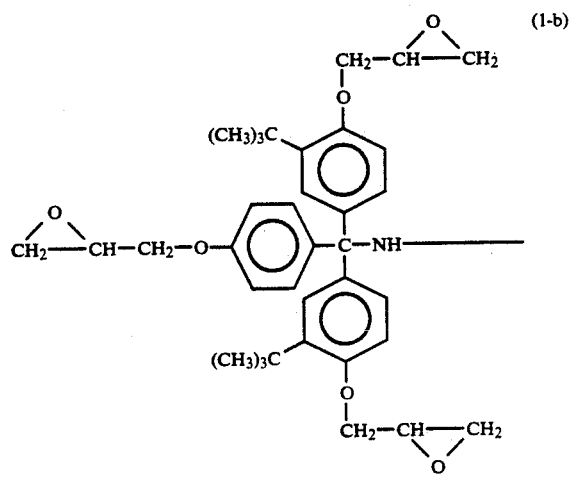

-continued

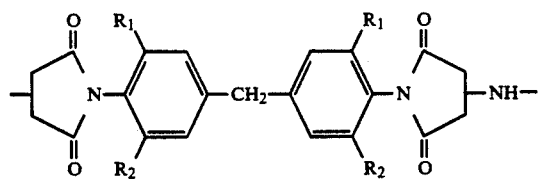

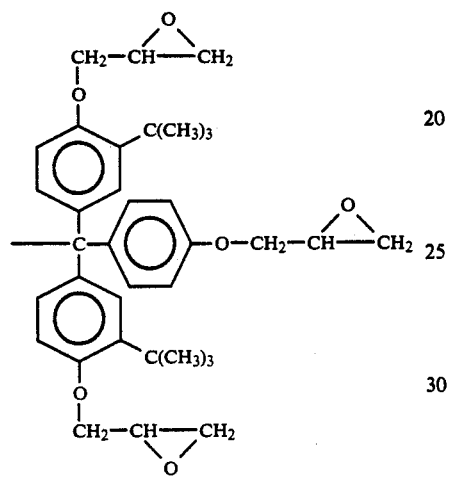

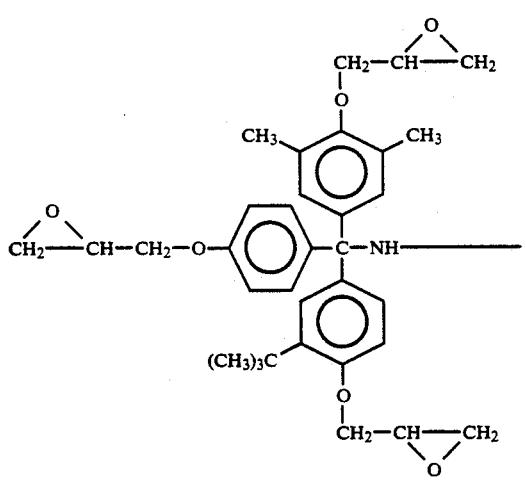

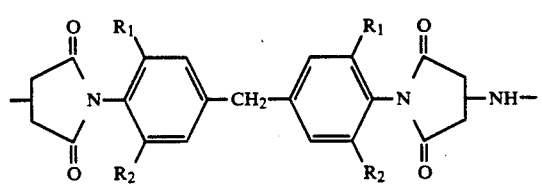

-continued

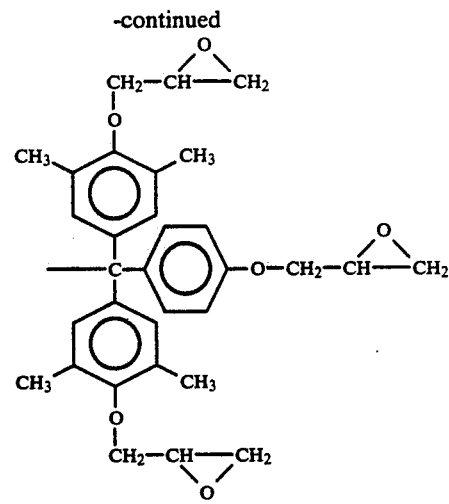

wherein, $R_1$ and $R_2$ represent independently H or $(CH_2)_n CH_3$ radical, and n represents 0 or an integer of 1 or above.

DETAILED DESCRIPTION OF THE INVENTION

The high performance epoxy resins (I-a), (I-b) and (I-c) used in the present invention may be synthesized by the following routes. That is, each of the epoxy resins having the structural formulas (II-a), (II-b) and (II-c) (available from Nippon Chemical Co.) and a nonpolar organic solvent, such as $CCl_4$ and $C_2H_4Cl_2$, are added to a round bottom flask equipped with a dropping funnel and a reflux condenser and dissolved by stirring. To this mixture 0.1 to 1% by weight of benzoyl peroxide (manufactured by Aldrich Chemical Co.) is added as a catalyst, then N-bromosuccinimide (NBS; manufactured by Aldrich Chemical Co.) is added dropwise, followed by reflux for 2 to 6 hrs. The resulting Br-substituted epoxy resins represented by the structural formula (III-a), (III-b) and (III-c), respectively, are dissolved in dry diethyl ether or tetrahydrofuran. Upon complete dissolution with the addition of magnesium metal, o-methylhydroxylamine (available from Aldrich Chemical Co.) is added thereto, and reacted for 4 to 8 hrs. with stirring, while the mixture is slightly heated.

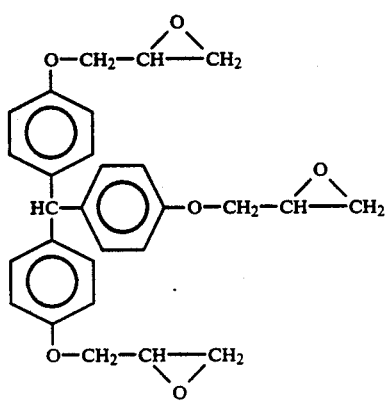
(II-a)

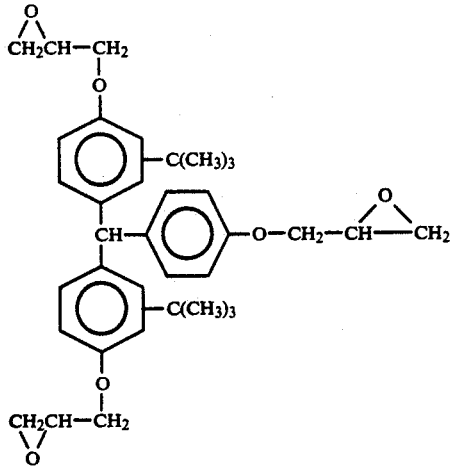

(II-b)

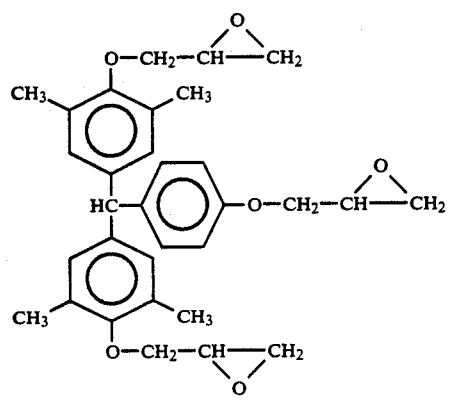

(II-c)

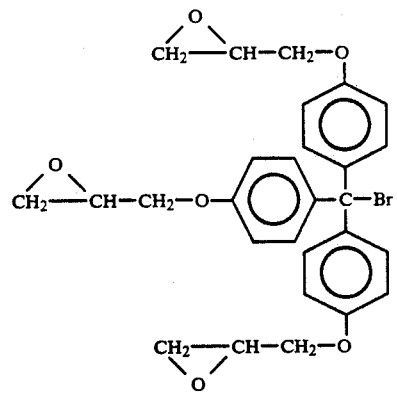

(III-a)

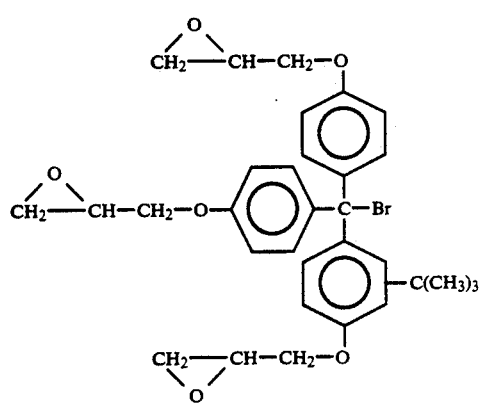

(III-b)

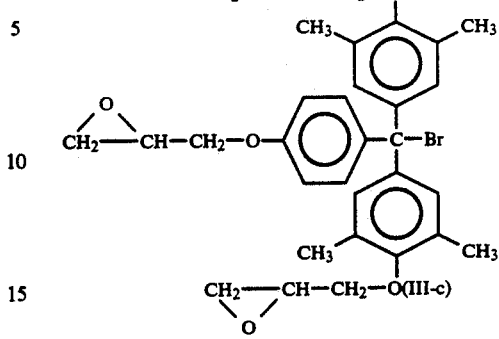

(II-c)

The resultant amine group-substituted epoxy resin and maleimide represented by the formula (IV) (Mitsubishi Petrochemical Co., Ltd.) are dissolved in DMF and reacted for several hours with reflux to obtain the high performance epoxy resins represented by the formulas (I-a), (I-b) and (I-c).

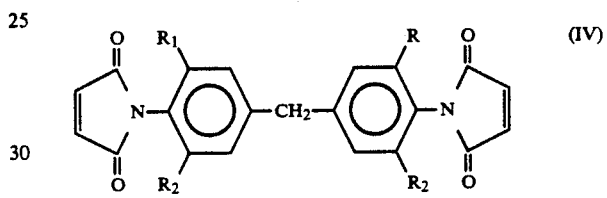

wherein, $R_1$ and $R_2$ have the same meaning in formula (I).

The epoxy resin composition of the present invention is based on the epoxy resin component obtained by mixing o-cresol-novolak type epoxy resin with the high performance epoxy resins represented by the formulas (I-a), (I-b) and (I-c). The epoxy resin composition of the present invention further includes a phenol-novolak type curing agent, a curing accelerator such as triphenylphosphine belonging to organic phosphine compounds, a filler such as high purity molten silica, a modifier such as epoxy-modified silicone oil, a mold release agent, a colorant, and an organic or inorganic flame retardant.

The preferred constitutional example of the present epoxy resin composition is as follows:

| | |
|---|---|
| o-cresol-novolak type epoxy resin | 0.1–20% by weight |
| high performance epoxy resin | 0.1–20% by weight |
| curing agent | 1.0–10.0% by weight |
| curing accelerator | 0.1–1.0% by weight |
| coupling agent | 0.5–2.0% by weight |
| colorant | 0.1–0.5% by weight |
| filler | 65.0–85.0% by weight |
| mold release agent | 0.1–1.0% by weight |
| organic flame retardant | 1.0–5.0% by weight |
| inorganic flame retardant | 0.5–3.0% by weight |
| plasticizer | 0.5–5.0% by weight |

The above resin composition is the most preferred for the resin composition of the present invention. The epoxy resin to be used in the present invention should be a good heat resistant o-cresol-novolak type resin, especially a highly pure epoxy resin having 190 to 220 epoxy equivalent weight with an impurity content below 10 ppm. As to the curing agent, a phenol-novolak type resin, which has a softening point of 80° to 100° C., 100 to 120 hydroxyl equivalent weight and below 10 ppm impurity content, may be used.

A high performance epoxy resin to be used specifically in the present invention includes imide-epoxy resin, and the amount to be used is preferably between 0.1 and 20.0% by weight, and more preferably between 1.0 and 10.0% by weight, based on the total weight of the resin composition. If the amount is less than 0.1% by weight, the heat and moisture resistance are very poor, and if the amount is greater than 20% by weight, phenomena such as resin bleed and mold fouling occur. Thus, moldability decreases and problems related to the gel time and conditions at post-curing result.

It is preferable to use high purity fused silica as the filler in the resin composition of the present invention. Fused silica having a particle size of 10 to 30 μm is preferable.

Curing accelerators include amines, imidazole derivatives and organic phosphine compounds being conventionally used. In the present invention, it is preferable to use triphenylphosphine, and 2-methylimidazole and 2-methyl-4-ethylimidazole as organic phosphine compounds and imidazole derivatives, respectively.

The coupling agent to be used in the surface treatment of inorganic fillers includes silane-based coupling agents. It is the most preferable to use γ-glycidoxypropyltrimethoxysilane. As plasticizers, silicone rubber or epoxy-modified silicone oil is conventionally used. In the present invention, plasticizers are used to increase the compatibility according to the high integration of semiconductors, and include an adduct of phenol-novolak resins and epoxy-modified silicone oil.

The epoxy resin composition of the present invention may further comprise 0.1 to 1.0% by weight of carnauba wax or Montan wax as a mold release agent, 0.1 to 0.5% by weight of carbon black as a colorant, brominated epoxy resin as an organic flame retardant and antimony trioxide as an inorganic flame retardant.

The resin composition of the present invention can be prepared by surface treating inorganic fillers with coupling agents, homogeneously mixing them with the remaining components in a Henschel mixer or other premixer, melt mixing the mixture at 90° to 110° C. for about 5 to 20 min. with a kneader or roll mill, cooling and pulverizing.

The resultant powdery composition may then be tableted by a tableting machine. In use, the obtained resin composition tablet is preheated with a high frequency preheater, and molded with a molding press at 170° to 180° C. for 90 to 120 sec. to seal the semiconductor elements.

As mentioned above, since the resin composition prepared by the present invention includes a high performance epoxy resin, in addition to the conventional cresol-novolak type epoxy resin, it has a high glass transition temperature and improved moisture resistance, and thus, can provide a resin composition suitable for sealing super-thin, high integrated semiconductor elements.

EXAMPLES

Hereinafter, the present invention will be described in detail by virtue of examples, which should not be construed as limiting the scope of the present invention.

Physical properties of the epoxy resin composition obtained from the examples are measured with the following methods:

1) Spiral flow: Measured at 175° C. of molding temperature and 70 kg.f/cm$^2$ of molding pressure with a mold prepared according to EMMI standard
2) Tg: Measured with TMA equipment
3) E(kg.f/mm$^2$): Measured with UTM according to ASTM D 190
4) Thermal expansion coefficient α(°C$^{-1}$): Measured according to ASTM D 696
5) Moisture content(%): Measured the saturated moisture content, after standing the molded article for 48 hrs. in 121° C., 2 atm. vapor
6) Resistant to cracking: Measured from the crack numbers produced in the 2,000 times thermal impact test on the molded chip under the test conditions having one cycle of −55° C., 30 min. and 150° C., 30 min.

The plasticizer in Table I is an epoxy-modified silicone oil; "KBM-403" is a silane coupling agent.

EXAMPLES 1-4

Constitutional components having the composition described in Table 1 are mixed in a Henschel mixer to give a powdery composition, except that epoxy resin represented by the formula (I-a) is used as the high performance epoxy resin of the present invention. The powdery composition is kneaded for 10 min. at 100° C., cooled, and ground to give epoxy resin molding materials. Physical properties thereof are listed on Table 2.

COMPARATIVE EXAMPLE 1

This Comparative Example 1 is conducted in the same manner as Examples 1-4, except that the high performance epoxy resin (I-a) of the present invention is not included. The physical properties thereof are also listed in Table 2.

EXAMPLES 5-8

Constitutional components having the composition set forth in Table 1 are mixed in a Henschel mixer to give a powdery composition, except that the epoxy resin (I-b) of the present invention is used as the high performance epoxy resin. The powdery composition is applied to the same test as Examples 1-4. The results are given in Table 2.

COMPARATIVE EXAMPLE 2

Comparative Example 2 is conducted in the same manner as Examples 5-8, except that the epoxy resin composition does not contain the high performance epoxy resin (I-b) of the present invention. The physical properties thereof are also shown in Table 2.

EXAMPLES 9-12

Constitutional components having the composition disclosed in Table 1 are mixed in a Henschel mixer to obtain powdery composition, except that the epoxy resin (I-c) of the present invention is used as the high performance epoxy resin. The powdery composition is applied to the same test as Examples 1-4. The results are presented in Table 2.

COMPARATIVE EXAMPLE 3

Comparative Example 3 is conducted in the same manner as Examples 9-12, except that the epoxy resin (I-c) of the present invention is excluded from the epoxy resin composition. The physical properties thereof are also demonstrated in Table 2.

TABLE 1

(Unit: % by weight)

| Components | \multicolumn{12}{c}{Example Nos.} | | | | | | | | | | | | Comparative Example Nos. | | |
|---|---|---|---|---|---|---|---|---|---|---|---|---|---|---|---|
| | 1 | 2 | 3 | 4 | 5 | 6 | 7 | 8 | 9 | 10 | 11 | 12 | 1 | 2 | 3 |
| o-Cresol-novolak epoxy resin | 13.57 | 12.57 | 8.07 | 3.07 | 14.57 | 13.07 | 8.07 | 3.07 | 12.57 | 10.57 | 8.07 | 3.07 | 15.07 | 15.07 | 15.07 |
| High performance epoxy resin (Imide-based epoxy resin) | 1.5 | 2.5 | 7.0 | 12.0 | 0.5 | 2.0 | 7.0 | 12.0 | 2.5 | 4.5 | 7.0 | 12.0 | — | — | — |
| Phenol-novolak curing agent | 5.83 | 5.83 | 5.83 | 5.83 | 5.83 | 5.83 | 5.83 | 5.83 | 4.83 | 4.83 | 4.83 | 4.83 | 5.83 | 5.83 | 4.83 |
| Triphenylphosphine | 0.4 | 0.4 | 0.4 | 0.4 | 0.38 | 0.38 | 0.38 | 0.38 | 0.4 | 0.4 | 0.4 | 0.4 | 0.4 | 0.38 | 0.4 |
| Fused silica | 73.8 | 73.8 | 73.8 | 73.8 | 73.8 | 73.8 | 73.8 | 73.8 | 74.8 | 74.8 | 74.8 | 74.8 | 73.8 | 73.8 | 74.8 |
| Plasticizer | 1.2 | 1.2 | 1.2 | 1.2 | 1.15 | 1.15 | 1.15 | 1.15 | 1.2 | 1.2 | 1.2 | 1.2 | 1.2 | 1.15 | 1.2 |
| Brominated epoxy resin | 1.25 | 1.25 | 1.25 | 1.25 | 1.30 | 1.30 | 1.30 | 1.30 | 1.25 | 1.25 | 1.25 | 1.25 | 1.25 | 1.30 | 1.25 |
| KBM 403 (manufactured by Shin-etsu Chemical Co., Ltd.) | .11 | 1.11 | 1.11 | 1.11 | 1.11 | 1.11 | 1.11 | 1.11 | 1.21 | 1.21 | 1.21 | 1.21 | 1.11 | 1.11 | 1.21 |
| Carnauba wax | 0.23 | 0.23 | 0.23 | 0.23 | 0.23 | 0.23 | 0.23 | 0.23 | 0.13 | 0.13 | 0.13 | 0.13 | 0.23 | 0.23 | 0.13 |
| $Sb_2O_3$ | 0.85 | 0.85 | 0.85 | 0.85 | 0.85 | 0.85 | 0.85 | 0.85 | 0.85 | 0.85 | 0.85 | 0.85 | 0.85 | 0.85 | 0.85 |
| Carbon black | 0.26 | 0.26 | 0.26 | 0.26 | 0.26 | 0.26 | 0.26 | 0.26 | 0.26 | 0.26 | 0.26 | 0.26 | 0.26 | 0.26 | 0.26 |

TABLE 2

| Content | \multicolumn{8}{c}{Example Nos.} | | | | | | | |
|---|---|---|---|---|---|---|---|---|
| | 1 | 2 | 3 | 4 | 5 | 6 | 7 | 8 |
| Spiral flow (in.) | 45 | 44 | 43 | 40 | 45 | 44 | 43 | 40 |
| Tg (°C.) | 197 | 195 | 193 | 200 | 187 | 190 | 193 | 203 |
| $\alpha$ ($\times 10^{-5}$/°C.) | 1.4 | 1.3 | 1.2 | 1.1 | 1.4 | 1.3 | 1.2 | 1.1 |
| E (kgf/mm$^2$) | 1200 | 1150 | 1250 | 1250 | 1200 | 1150 | 1250 | 1250 |
| Moisture content (%) | 0.40 | 0.42 | 0.41 | 0.38 | 0.42 | 0.43 | 0.40 | 0.38 |
| * Resistance to crack (2000 times) | 2/600 | 1/600 | 1/600 | 0/600 | 2/600 | 1/600 | 0/600 | 0/600 |

| Content | \multicolumn{4}{c}{Example Nos.} | | | | \multicolumn{3}{c}{Comparative Example Nos.} | | |
|---|---|---|---|---|---|---|---|
| | 9 | 10 | 11 | 12 | 1 | 2 | 3 |
| Spiral flow (in.) | 45 | 44 | 43 | 40 | 45 | 45 | 45 |
| Tg (°C.) | 197 | 195 | 193 | 200 | 180 | 170 | 180 |
| $\alpha$ ($\times 10^{-5}$/°C.) | 1.4 | 1.3 | 1.2 | 1.1 | 1.7 | 1.7 | 1.7 |
| E (kgf/mm$^2$) | 1200 | 1150 | 1250 | 1250 | 1200 | 1200 | 1200 |
| Moisture content (%) | 0.40 | 0.42 | 0.41 | 0.38 | 0.5 | 0.5 | 0.5 |
| * Resistance to crack (2000 times) | 2/600 | 1/600 | 1/600 | 0/600 | 6/600 | 6/600 | 6/60 |

* Denominator represents the number of samples, and numerator represents the failure numbers.

As can be seen from the above results, the epoxy resin composition of the present invention has superior moldability and high heat and moisture resistance over the compositions of the comparative Examples, and also has improved resistance to cracking.

We claim:

1. Epoxy resin composition for sealing semiconductor elements comprising an o-cresol-novolak epoxy resin, a phenol novolac curing agent, a curing accelerator, a plasticizer and a high performance epoxy resin, wherein the high performance epoxy resin is selected from the group consisting of epoxy resins represented by the formulae (I-a), (I-b) and (I-c), as follows;

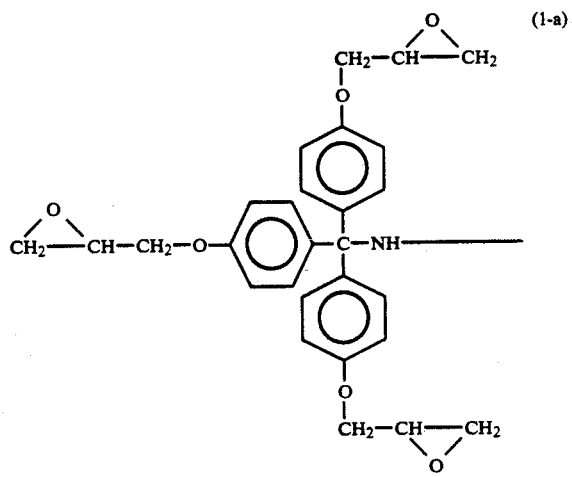

(1-a)

-continued
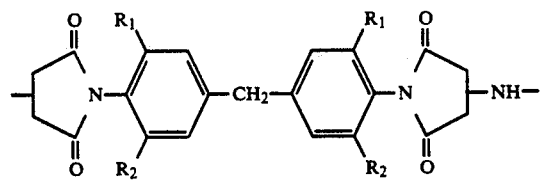
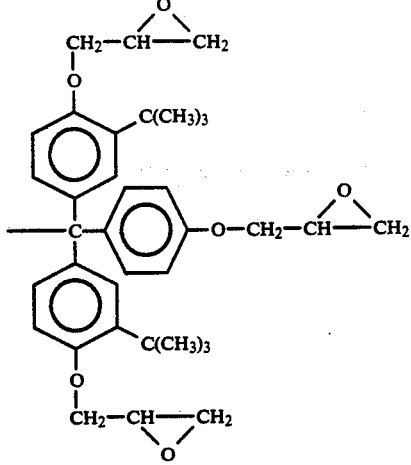
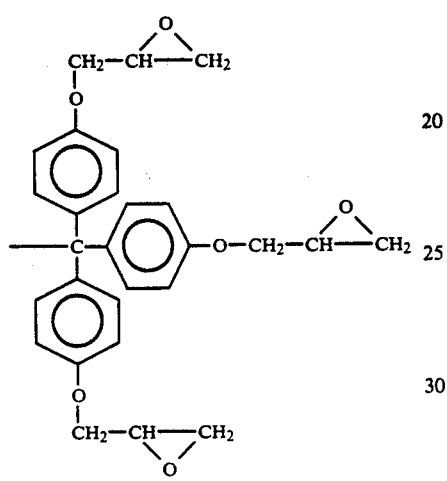
(1-c)
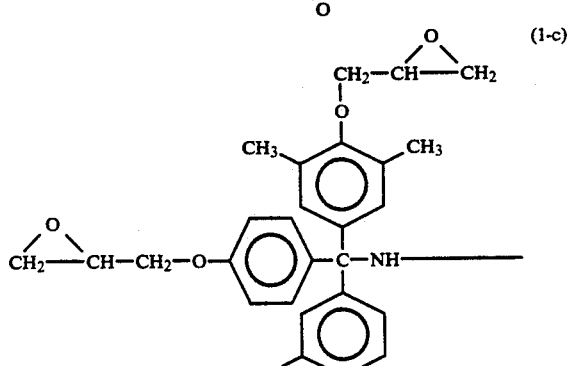
(1-b)
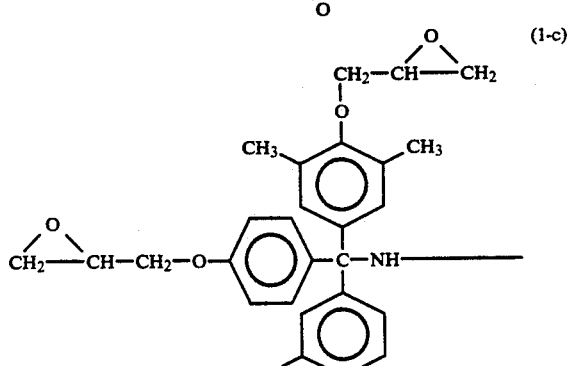
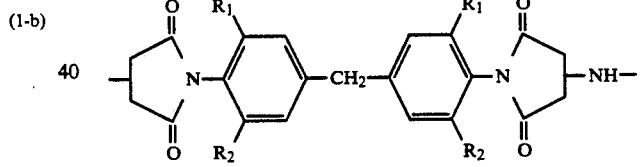
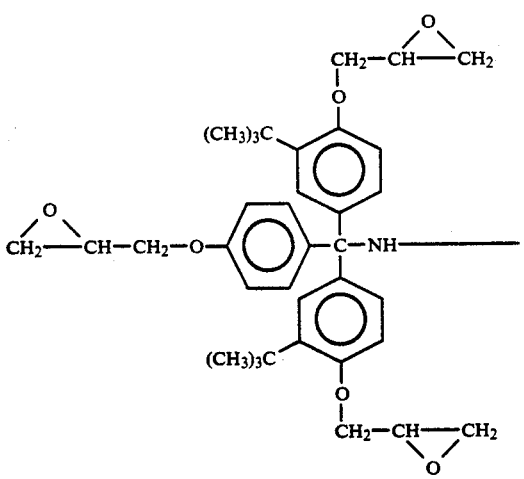
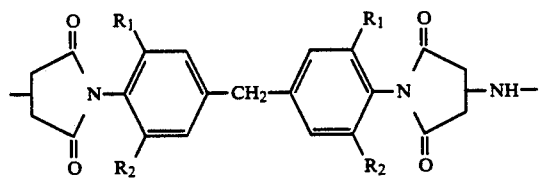
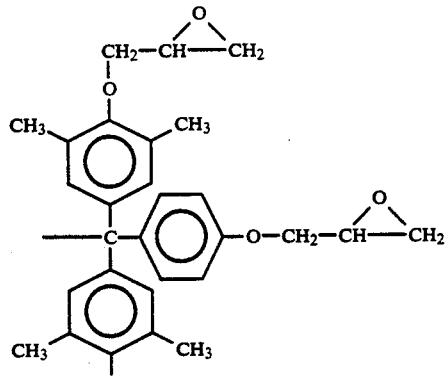
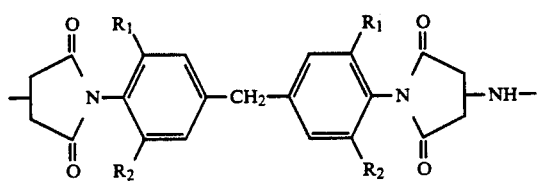
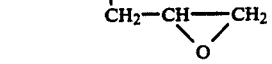
wherein, $R_1$ and $R_2$ represent independently H or a $-(CH_2)_nCH_3$ radical, and n represents 0 or an integer of 1 or greater.
2. Epoxy resin composition claimed in claim 1 wherein the high performance epoxy resin is contained in an amount of from 0.1 to 20.0% by weight based on the total weight of the epoxy resin composition.
* * * * *

UNITED STATES PATENT AND TRADEMARK OFFICE
CERTIFICATE OF CORRECTION

PATENT NO. :  5,254,605               Page 1 of 4

DATED    :  October 19, 1993

INVENTOR(S) :  Kim et al.

It is certified that error appears in the above-identified patent and that said Letters Patent is hereby corrected as shown below:

In the Abstract, replace the formulas (1-a), (1-b) and (1-c) and subsequent text with the following:

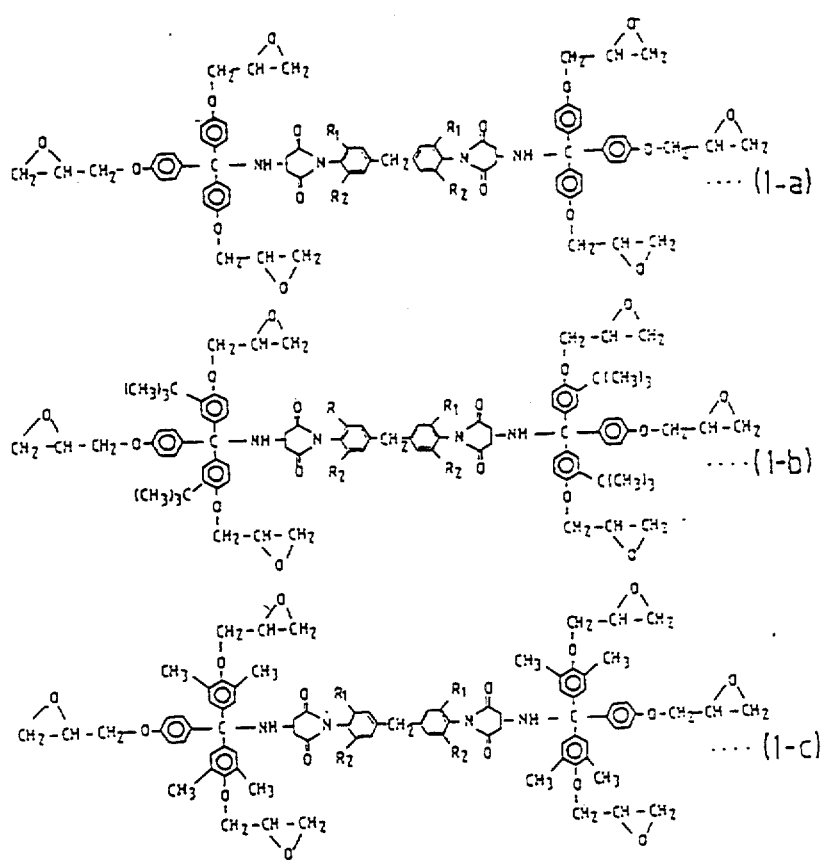

wherein, $R_1$ and $R_2$ represent independently H or $(CH_2)nCH_3$ radical, and n represents 0 or an integer of 1 above.

UNITED STATES PATENT AND TRADEMARK OFFICE
CERTIFICATE OF CORRECTION

PATENT NO. :   5,254,605

DATED      :   October 19, 1993

INVENTOR(S) :  Kim et al.

It is certified that error appears in the above-identified patent and that said Letters Patent is hereby corrected as shown below:

In Col. 5, lines 52-68, replace Formula (III-b) with the following formula (III-b):

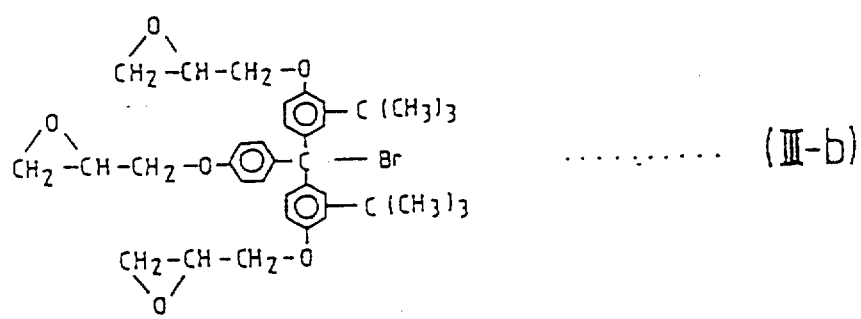

In Col. 6, lines 1-17, replace the Formula with the following Formula (III-c):

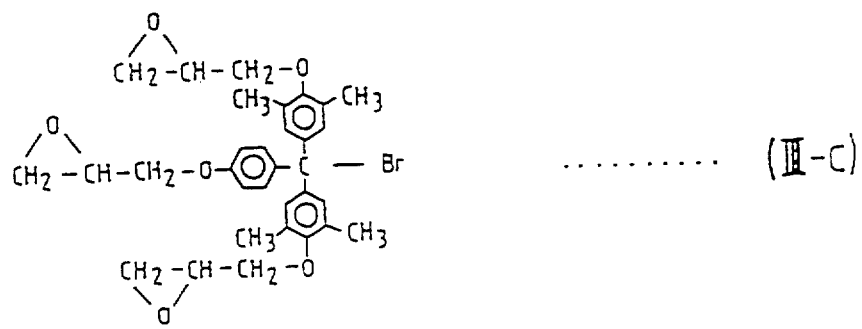

UNITED STATES PATENT AND TRADEMARK OFFICE
CERTIFICATE OF CORRECTION

PATENT NO. : 5,254,605    Page 3 of 4

DATED : October 19, 1993

INVENTOR(S) : Kim et al.

It is certified that error appears in the above-identified patent and that said Letters Patent is hereby corrected as shown below:

In Claim 1, at Col. 11, line 50 to Col. 12, line 63, replace the formulas with the following:

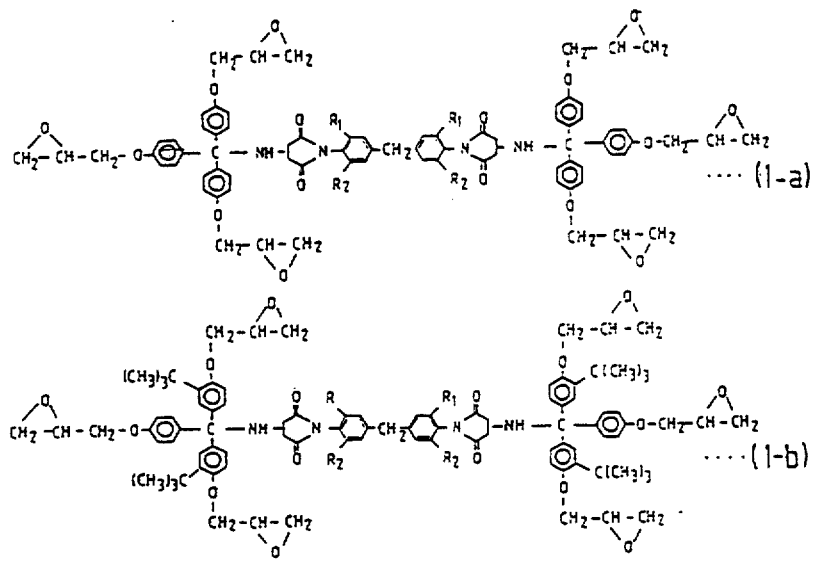

UNITED STATES PATENT AND TRADEMARK OFFICE
CERTIFICATE OF CORRECTION

PATENT NO. : 5,254,605

DATED : October 19, 1993

INVENTOR(S) : Kim et al.

It is certified that error appears in the above-indentified patent and that said Letters Patent is hereby corrected as shown below:

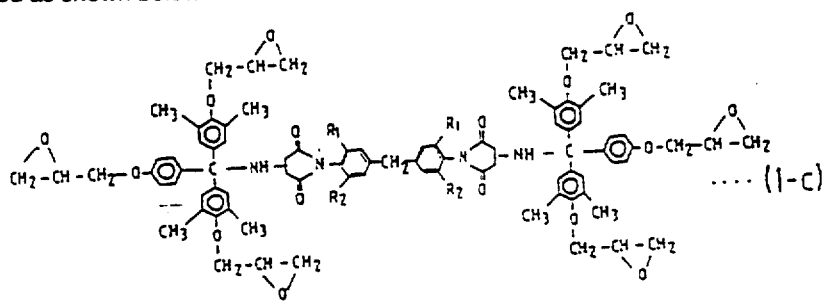

wherein, $R_1$ and $R_2$ represent independently H or $(CH_2)nCH_3$ radical, and n represents 0 or an integer of 1 above.

Signed and Sealed this

Thirtieth Day of July, 1996

Attest:

BRUCE LEHMAN

*Attesting Officer*   *Commissioner of Patents and Trademarks*